Figure 4:
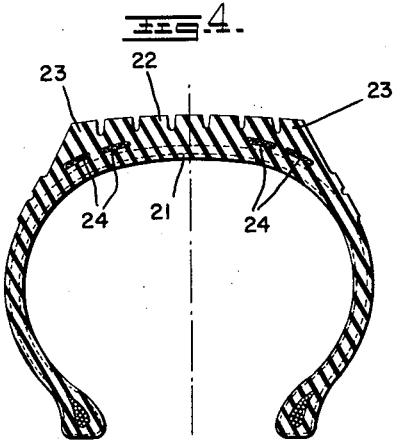

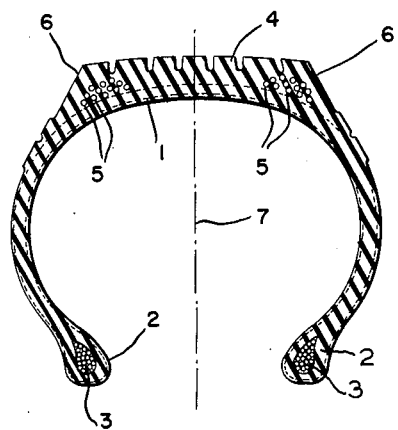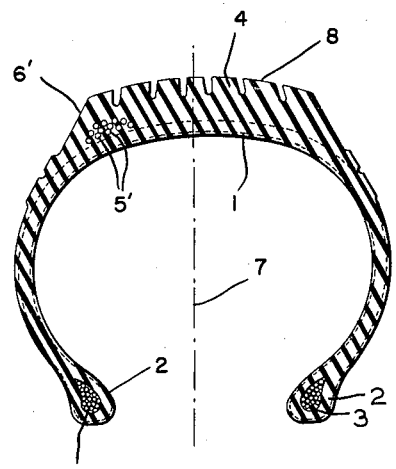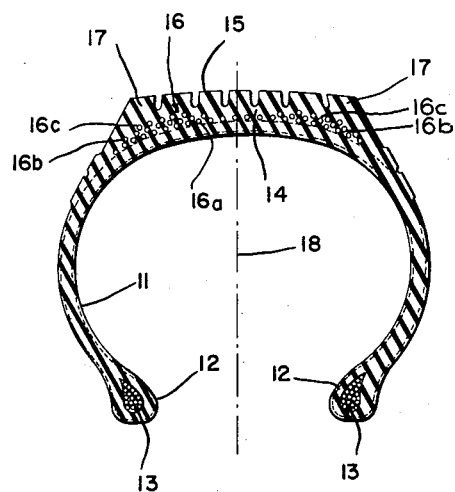

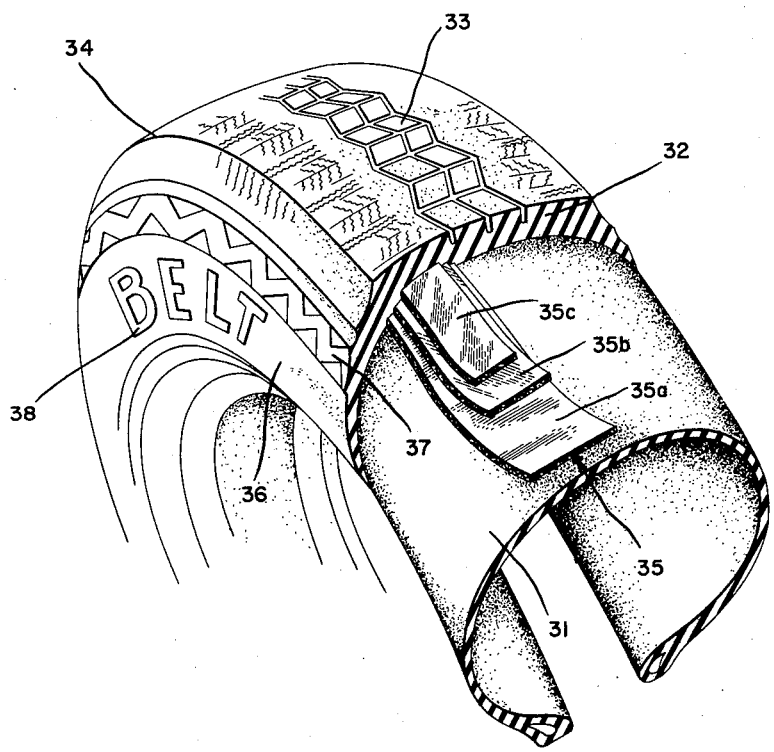

United States Patent Office 3,057,392
Patented Oct. 9, 1962

3,057,392
TIRE CONSTRUCTION
Friedrich K. H. Nallinger, Albrecht-Duerer-Weg 5,
Stuttgart-N, Germany
Filed Oct. 17, 1958, Ser. No. 767,874
Claims priority, application Germany Oct. 31, 1957
7 Claims. (Cl. 152—361)

The present invention relates to pneumatic tires for vehicles of all types, especially for motor vehicles, which are provided with a reinforcing inlay or insert arranged between the body member of the tire and the tread portion thereof in the form of wires, filaments, cords, bands, woven strips or the like made, for example, of steel, metal, synthetic material or natural fiber.

With the use of pneumatic tires of this type, especially with the use of those provided with a reinforcing inlay or insert consisting of steel wire, it is possible to reduce, particularly at higher driving speeds, the so-called roll bulges at the place of contact between the tire and the road surface. As a result of such a prior art construction, the tire has a smaller internal friction and therewith produces less heat. The capacity thereof to provide lateral guidance is particularly large, and it is further possible to eliminate practically completely, while travelling through curves, the creation or production of noises which are present otherwise in a very pronounced manner and are caused by the tires because such tire is subjected to or undergoes with the contact surface thereof only a slight displacement relative to the road or road surface or does not undergo any such displacement at all.

Aside from the aforementioned advantages, the known pneumatic tires of the prior art having reinforcing inserts or inlays extending over the entire width of the tread portion exhibit the disadvantage that such tire, at lower driving speeds, for example, at speeds up to 50 kilometers per hour, becomes too stiff or hard with respect to its own spring-characteristics and now produces noises of different type. For example, while driving over a cobblestone pavement, the tire produces a relatively low frequency clattering noise and initiates swinging movements which are transmitted to the entire vehicle as droning sounds so that the known tires with reinforcing inlays or inserts extending in a continuous manner across the width of the tire tread portion are not readily used for high qaulity passenger motor vehicles.

Accordingly, the present invention provides a pneumatic tire provided with a reinforcing inlay or insert which offers essentially all the adavntages of the known prior art reinforcing insert construction without the disadvantages thereof.

The present invention essentially consists in that the reinforcing inlay or insert extends, at least for its most part, only over the lateral edge or rim zones of the tread portion of the tire, approximately within the region of the tire shoulder. By the use of such an arrangement of the reinforcing inlays or inserts, it is possible to achieve a tire that is relatively soft within the central part of the tread portion so that during the drive, for example, over a cobblestone pavement, this central tire part may readily follow the surface contour of the road and is able to conform itself to the same and, therefore, produces only relatively little noise. Furthermore, the tire in accordance with the present invention has a lesser tendency to produce swinging movements because it is not forced to jump over small obstacles in the road but may embed the same within itself like the conventional pneumatic tire without reinforcing insert or inlay.

While travelling through a curve, when the tire bends slightly toward the side, the reinforcing inlay or insert in accordance with the present invention becomes fully effective and thereby assures a good side or lateral guidance for the vehicle.

In one embodiment according to the present invention, a reinforcing inlay or insert is arranged within the region of each of the two tire shoulders. In connection therewith, the two reinforcing inserts may be arranged symmetrically with respect to the center line of the tire cross section or profile.

In another embodiment according to the present invention, a reinforcing inlay or insert is arranged only within the region of one of the two tire shoulders. However, in both of the aforementioned cases, the contact surface of the tread portion may be shaped in a relatively strongly arcuate manner, as is known per se, and the width of each reinforcing inlay or insert may decrease from each insert layer to the next in a direction toward the tire outside.

According to a further feature in accordance with the present invention, the width of adjacent layers of the reinforcing inserts not only decrease from each layer to the next in a direction toward the tire outside, but the inner reinforcing insert layer or layers which are disposed closest to the body portion of the tire are enlarged or widened to such an extent in the direction toward the center line of the tire profile or cross section that at least the innermost reinforcing insert layer directly adjacent to the body portion of the tire forms a continuous or interconnected reinforcing strip which extends over the entire width of the tread portion of the tire.

By the use of an arrangement as last described hereinabove, it is possible to provide a tire construction in which the cross sectional transitions between the sections of the tread portion provided with reinforcing inserts and those sections of the tread position consisting only of rubber take place more gradually. As a result thereof, the occurrence of relatively high peak stresses during certain movements of the tire, in which within the interior of the tire, i.e., also in the rubber layer thereof, one portion of the rubber is moved with respect to the next adjacent portion thereof thereby producing heat within the tire interior and causing these relatively high peak stresses leading to premature destruction of this tire part, especially at relatively high driving speeds, are avoided and therewith the tearing of the tire is avoided at this place.

The last-described construction with one or several reinforcing insert layers disposed closest to the body portion of the tire which extend in a continuous or interconnected manner across the entire width of the tread portion of the tire may be further improved as regards its functional advantages by making this layer or layers of individual bands spaced from one another in the transverse direction of the tire. The favorable cross sectional transitions between sections of the tread portion with and without reinforcing inserts as well as the ability to withstand the tearing forces is thereby further improved.

According to still another feature of the present invention, a tire of the type provided with a reinforcing insert only within the region or zone of one tire shoulder may be additionally provided at the side thereof at which the reinforcing insert is arranged with a clearly noticeable and recognizable, possible colored and preferably also decorative mark or design, for example, also in a manner of a white-sidewall tire.

Since tires provided with a reinforcing insert arranged only at one tire shoulder between the body portion and the tread portion have to be mounted approximately on the motor vehicle in such a manner that the reinforcing insert comes to lie on the outer side of the pneumatic tire, it may be advantageously achieved by the use of an indicia, design or mark in accordance with the present invention that the mounting of the tire may be undertaken without the need for a special prior investigation concerning the position within the tire of the reinforcing insert thereof and without the need for increased attention or care by the personnel, in such a manner that the recognizable design or mark is disposed on the outer side thereof, i.e., on the side away from the vehicle. A colored or any other decorative ornamentation, which may also be used, increases the recognition effectiveness and therewith the safety for proper mounting of the tire. Furthermore, the design or mark may be additionally enhanced, according to a further feature in accordance with the present invention, by combining the design, mark or indicia of the present invention with the usual notation or marks normally found on the tire, for example, indicating the type, size and make thereof.

According to still a further feature of the present invention, improving the characteristic of the pneumatic tires thereof, the threads or wires of the filaments, cords, bands, strips or the like may be arranged in the individual insert layers of the reinforcing insert, at least in part, transversely or at an angle to the running or rotary direction of the tire, that furthermore the threads or wires of the filaments, cords, bands, strips or the like of individual insert layers cross one another or are arranged in a crosswise manner with respect to those of adjacent insert layers, and that individual insert layers are composed in themselves of different materials or are made of different material with respect to adjacent insert layers, for example, of steel, metal, synthetic material, synthetic fibers or natural fibers.

Accordingly, it is an object of the present invention to provide a tire construction for a pneumatic tire used for vehicles, particularly motor vehicles, in which the disadvantages normally found with the use of conventional reinforcing inlays or inserts in the thread portion thereof are avoided while retaining essentially all those advantages normally gained thereby.

Another object of the present invention is the provision of a pneumatic tire for vehicles which includes a reinforcing insert reinforcing the tire and preventing bulging thereof, especially within the regions of the tire shoulders, and which does not offer the relatively stiff spring characteristic but which provides a relatively soft and smooth running or contact surface adapted to conform itself to the contours of the road surface so as to avoid swinging movements and therewith droning within the vehicle.

A further object of the present invention is the provision of a pneumatic tire having an insert which is so arranged and constructed as to avoid squealing of the tires when travelling through curves while simultaneously therewith preventing the production of rattling or clattering noises by the tires when passing over uneven roads, for example, while travelling over cobblestone pavements at relatively lower speeds.

These and other objects, features and advantages of the present invention will become more obvious from the following description when taken in connection with the accompanying drawing, which shows for purposes of illustration only, several embodiments in accordance with the present invention, and wherein:

FIGURE 1 is a cross sectional view through a pneumatic tire in accordance with the present invention provided with a reinforcing insert within the region of both tire shoulders, FIGURE 2 is a cross sectional view, similar to FIGURE 1, through a different embodiment of a pneumatic tire provided with a reinforcing insert only within the region of one tire shoulder in accordance with the present invention, FIGURE 3 is a cross sectional view through still another embodiment of a pneumatic tire with a reinforcing insert gradually changing in the direction toward the tire outside in accordance with the present invention.

Figure 5:
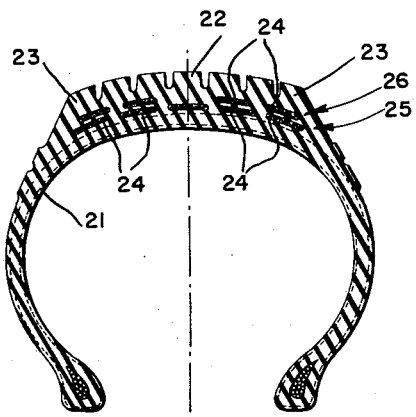
Figure 6:
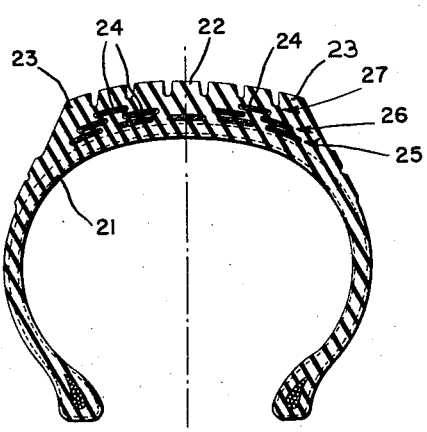

FIGURES 4, 5 and 6 are cross sectional views through three still further embodiments of pneumatic tires within a reinforcing insert made of bands spaced in the transverse direction of the tire in accordance with the present invention, and FIGURE 7 is a perspective view of a pneumatic tire in accordance with the present invention with parts thereof broken away to show the details of construction thereof and provided with an ornamental design in accordance with the present invention.

Referring now to the drawing, wherein like reference numerals are used throughout the various views to designate like parts, and more particularly to FIGURE 1, the tire shown therein consists essentially of the usual body member or portion 1 provided with bead portions 2, and beads or bead cores 3 disposed therein and of the tread portion 4. The reinforcing inserts 5, only schematically illustrated in the drawing, which may consist, for example, of individual insert layers formed by wire filaments, stranded wires, cords or the like made of any suitable material, for instance, steel, extend between the body portion 1 and the tread portion 4 only over the lateral rim zones of the tread portion 4 approximately within the region of the tire shoulders 6. The reinforcing inlays or inserts 5 are thereby disposed essentially symmetrically with respect to the center line 7 of the tire cross section.

It will be readily understood that the tire illustrated in FIGURE 1 acts, during straight drives, when primarily the soft central part of the tread portion 4 rolls off along the road surface, as a pneumatic tire essentially without any reinforcing insert so that, at that time, the desired lessening of noise and swinging movements is fully attained, particularly with relatively low driving speeds, whereas, while travelling through a curve, when that tire shoulder 6 disposed on the outer side of the curve is also used to carry the load, an equally good and effective lateral guidance and a prevention of the squealing noises is achieved as is possible with the tires having the known reinforcing inserts of the prior art which extend clear across the width of the tread portion.

The tire illustrated in FIGURE 2, like the tire in FIGURE 1, consists essentially of the body portion 1, provided with bead portions 2, and the bead cores 3 therein, and of the tread portion 4. However, intermediate the body portion 1 and the tread portion 4, a reinforcing insert 5′ is arranged exclusively within the region of only one tire shoulder 6′. The running surface 8 of the tread portion is relatively strongly arcuate in order to use primarily the part of the running surface 8 disposed close to the center line 7 for carrying or supporting purposes during straight driving at slow speeds.

A similar arcuate construction may also be used for the running surface of the embodiment of FIGURE 1. This construction is such as to enhance the resilience of that part of the tread portion intermediate the rim zones of FIGURE 1, the insert means of this figure causing a lesser degree of resilience in the regions of the rim zones than in the intermediate part of the tread portion.

Consequently, the tire of FIGURE 2 also rolls off along the road surface, with straight drives at relatively low speeds, like a pneumatic tire without any reinforcing insert in a relatively noiseless manner, whereas the one-sided arrangement of the reinforcing insert 5′ imparts to the vehicle a good guidance toward one side while travelling through a curve, and also avoids the squealing of the tire in the direction toward this side. It is, of course, understood that the wheels and tires belonging to a motor vehicle axle, such as the vehicle front or rear suspension, must be mounted in that case in such a manner that the reinforcing inserts of both tires are disposed symmetrically with respect to the vehicle longitudinal axis, either on the inner or outer side of the respective wheels.

The reinforcing insert 5 of FIGURE 1 and the reinforcing insert 5′ of FIGURE 2 are so constructed that the width of each insert decreases from one insert layer to the next in the direction toward the tire outside so that tire material without producing therein any hot spots and so that no sudden cross sectional transitions occur between the sections of the tread portions provided with inserts and those provided without them.

In the embodiment according to FIGURE 3, in which the insert layers are so arranged as to avoid any stress peaks, the tire essentially consists of the usual body portion 11 provided with bead portions 12 and the bead cores 13, and of the tread portion 14 having the usual running or contact surface 15. The reinforcing insert generally designated by reference numeral 16 is arranged between the tread portion 14 and the body portion 11. The reinforcing insert 16 is formed of individual insert layers consisting, for example, of wire filaments, stranded wires, cords or the like. The lowermost insert layer 16a of the reinforcing insert 16, which is disposed in proximity to the body portion 11, extends in an interconnected manner over the entire width of the tread portion 14. Within the region of the tire shoulders 17, the insert layers 16a form together with the smaller insert layer 16b disposed thereabove and together with the next following still smaller insert layer 16c a reinforcing rim insert so that the strength of the reinforcing insert 16 increases in a gradual manner symmetrically from the center line 18 of the tire cross section toward the rim zones.

The insert layer 16a assures a favorable distribution and absorption of the tire loads and stresses, whereas the reinforcing rim inserts or inlays formed by insert layer 16a and the additional insert layers 16b and 16c assure an advantageous lateral guidance for the vehicle. The tread portion 14 is relatively soft within the region between the rim reinforcing inserts 16b, 16c so that the tire, during straight drives, when primarily the central portion thereof rolls off along the road, the pneumatic tire in accordance with this embodiment acts like any pneumatic tire without reinforcing insert. While in the drawing, for purposes of clarity, each individual insert layer of the reinforcing insert 16 is indicated by a few wire cross sections, it is understood that in the actual embodiment, the individual wires, stranded wires or cords of each insert layer are disposed closely adjacent to one another. Furthermore, each insert layer is disposed closely over the other. This is, of course, also true for all the other embodiments in accordance with the present invention.

In the embodiment according to FIGURE 4, one insert layer each consisting of a reinforcing insert is arranged between the body portion 21 and the tread portion 22 of the tire within the lateral rim zones of the tread portion 22 in the region of the tire shoulders 23. Each insert layer consists of a plurality of individual bands 24 arranged adjacent each other with spacing therebetween and made of mesh or fabric, woven in any suitable manner, for instance, of metal, synthetic fibers or natural fibers.

According to FIGURE 5, one or possibly several inner insert layers 25 directly adjacent the body portion 21 extend between the body portion 21 and the tread portion 22 of the tire essentially over the entire width of the tread portion 22. The innermost insert layer 25 may thereby be again subdivided into individual bands 24 arranged next to one another with predetermined spacing between individual bands. The next adjacent insert layer 26 which, however, extends only over the two lateral rim zones 23 of the tire, is also formed by similar individual bands 24 arranged adjacent one another with spacing therebetween.

In the embodiment according to FIGURE 6, an additional layer 27 consisting of individual bands 24 is provided over the bands 24 of the second layer 26 shown in FIGURE 5, which extends only over the lateral rim zones of the tire.

In the embodiment according to FIGURE 7, the body portion of the tire is designated by reference numeral 31, and the tread portion thereof with reference numeral 32. The tread portion 32 is provided with a running or contact surface 33. Intermediate the body portion 31 and the tread portion 32 of the tire, a reinforcing insert generally designated by reference numeral 35 is arranged within the region of one of the tire shoulders 34 which reinforcing insert 35 consists of individual insert layers 35a, 35b and 35c disposed one above the other. In order to assure that this tire, in accordance with the present invention as shown in FIGURE 1, is properly mounted on the vehicle, i,e., in order that the insert layer 35 is disposed with the mounted tire on the side away from the vehicle, the lateral surface 36 of the tire is provided on the side of the reinforcing insert 35 with a readily recognizable design or mark 37 in the form of a ring of triangular profile configuration and extending along the entire periphery of the tire which, for purposes of increasing the recognizability thereof and simultaneously for purposes of providing a pleasing decorative effect, may be also made of different color. The lettering or designation 38 arranged in the side surface 36 of the tire further contributes for purposes of increasing the recognition feature thereof which will become particularly distinctly noticeable in contrast to the side surface of the tire if the side surface is made of different color, for example, white in the manner of a white sidewall tire.

Instead of the noticeable design 37 in the form of a triangularly profiled ring, other noticeable designs or indicia which designate the position of the reinforcing insert 35 within the tire and which simultaneously act as decoration, may be used, for example, in the form of rings, lines, knurled patterns or the like. Furthermore, the arrangement of the usual tire inscription may be disposed only on that tire side on which the insert 35 is disposed in combination with such rings, lines or knurled patterns for purposes of contributing, in an advantageous manner, to the proper mounting of the tire.

The threads or wires of the individual insert layers 35a, 35b and 35c of the reinforcing insert 35 extend at an angle to the running direction of the tire and cross one another. The threads or wires of the insert layer 35a may thereby extend essentially transversely to the direction of rotation of the tire, whereas the threads or wires of the next adjacent insert layers 35b and 35c cross each other while forming essentially equal angles with respect to the direction of rotation of the tire. Of course, this difference in the arrangement of the direction of the threads or fibers may be varied to suit the particular needs and may be applied also to the other embodiments illustrated herein, for example, to the embodiments of FIGURES 3 to 6.

The insert layers 35a, 35b and 35c may also be made of different material, for example, of steel wires in combination with synthetic threads, however, the insert layer 35a may also be made entirely of, for example, steel wires, whereas the insert layer 35b may be made of metal mesh or metallic woven fabric and the insert layer 35c of woven fabric of synthetic material so that in that case the reinforcing inserts become increasingly softer in the radial direction toward the outside. This feature of gradual variation in the direction toward the tire outside of the rigidity of individual insert layers may also be applied to all the other embodiments illustrated herein.

While I have shown and described several embodiments in accordance with the present invention, it is understood that the same is not limited thereto but is susceptible of many changes and modifications within the spirit and scope of the present invention. Any suitable material or fabric may be used for purposes of the reinforcing inserts as long as they produce the desired results. Thus, it is readily understood that the present invention is not limited to the embodiment illustrated herein, but may be modified within the scope and spirit of the present invention, and I therefore do not wish to be limited to the specific embodiments and the details illustrated herein but

I claim:

1. A pneumatic tire for vehicles of all types, especially motor vehicles, comprising a body portion, a tread portion with lateral rim zones, tire shoulders, and insert means arranged intermediate said body portion and said tread portion, said insert means comprising a plurality of insert layers extending only over one of said lateral rim zones of said tread portion approximately within the region of one of said tire shoulders, the outer surface of said one of said shoulders intersecting the running surface of said tread portion, said insert means being disposed laterally of said outer surface, and external recognition means disposed on the side of said tire corresponding to the side thereof on which said insert means is located to readily ascertain by external inspection the location within said tire of said insert means.

2. A pneumatic tire according to claim 1, wherein said external recognition means is made of a color different from the external color of said tire.

3. A pneumatic tire according to claim 2, wherein said external recognition means includes a decorative design along the outer surface of said tire.

4. A pneumatic tire according to claim 1, wherein said external recognition means is located on the same side of said tire as the customary designation thereof indicating the type, size and make thereof.

5. A pneumatic tire for vehicles of all types, especially motor vehicles, comprising a body portion, a tread portion with lateral rim zones and tire shoulders, the outer surfaces of said shoulders intersecting the running surface of said tread, and insert means arranged intermediate said body portion and said tread portion, said insert means comprising a plurality of individual inserts extending over each of said rim zones approximately in the region of said tire shoulders, some of said individual inserts being spaced generally radially outwardly of others of said individual inserts, and all of said inserts being disposed laterally of said outer surfaces of said shoulders, said tread portion having a central part intermediate said rim zones free of said insert means.

6. A pneumatic tire for vehicles of all types, especially motor vehicles, comprising a body portion and a tread portion with lateral rim zones and tire shoulders, said tread portion further comprising a central part intermediate said rim zones, the outer surfaces of said shoulders intersecting the outer surfaces of said tread portion, a reinforcing insert disposed between said tread portion and said body portion and extending into said rim zones, said reinforcing insert comprising means effecting substantially lesser resilience of said rim zones than that of said central part, said central part being of a resilience enabling said central part to conform to irregularities in a road surface travelled by said tire, said means effecting substantially lesser resilience comprising a plurality of insert layers including an innermost layer in proximity to said body portion, each of said insert layers including a plurality of individual inserts arranged intermediate said body portion and said tread portion and extending over said rim zones, said layers being superposed to one another in the radial direction of the tire, said innermost layer extending toward the center line of the tire cross section and forming an insert strip of uniform thickness extending in an interconnected manner over the entire width of said tread portion, said superposed layers being of decreasing width in directions radial of the tire and thereby effecting an increase of strength of said reinforcing insert symmetrically from said center line toward said rim zones.

7. A pneumatic tire for vehicles of all types, especially motor vehicles, comprising a body portion and a tread portion with lateral rim zones and tire shoulders, said tread portion further comprising a central part intermediate said rim zones, the outer surfaces of said shoulders intersecting the outer surfaces of said tread portion, said lateral rim zones each being provided with means effecting substantially lesser resilience of said rim zones than that of said central part, said central part being of a resilience enabling said central part to conform to irregularities in a road surface travelled by said tire, said means effecting substantially lesser resilience comprising a plurality of insert layers each including a plurality of individual inserts arranged intermediate said body portion and said tread portion and extending over each of said rim zones, said layers being superposed with respect to one another in the radial direction of the tire, said central part being free of inserts, each said plurality of insert layers being disposed laterally of a respective one of said tire shoulders.

References Cited in the file of this patent

UNITED STATES PATENTS

| | | |
|---|---|---|
| 840,503 | Marks | Jan. 8, 1907 |
| 999,157 | Eckrode | July 25, 1911 |
| 1,381,173 | Dwork | June 14, 1921 |
| 1,530,574 | Paull | Mar. 24, 1925 |
| 2,118,774 | Cadwell | May 24, 1938 |
| 2,242,430 | Kraft | May 20, 1941 |
| 2,493,614 | Bourdon | Jan. 3, 1950 |
| 2,786,507 | Howe et al. | Mar. 26, 1957 |

FOREIGN PATENTS

| | | |
|---|---|---|
| 700,435 | Great Britain | Dec. 2, 1953 |
| 549,017 | Italy | Oct. 4, 1956 |